United States Patent
Andrews et al.

(10) Patent No.: US 10,440,133 B2
(45) Date of Patent: Oct. 8, 2019

(54) INFERRING A SOCIAL CONNECTION

(71) Applicant: LinkedIn Corporation, Mountain View, CA (US)

(72) Inventors: June H. Andrews, San Francisco, CA (US); Xin Cai, San Jose, CA (US); Ajit Datar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 657 days.

(21) Appl. No.: 14/743,858

(22) Filed: Jun. 18, 2015

(65) Prior Publication Data
US 2016/0350666 A1 Dec. 1, 2016

Related U.S. Application Data

(60) Provisional application No. 62/169,373, filed on Jun. 1, 2015.

(51) Int. Cl.
*G06F 15/18* (2006.01)
*H04L 29/08* (2006.01)
*G06N 5/02* (2006.01)
*G06Q 50/00* (2012.01)

(52) U.S. Cl.
CPC .............. *H04L 67/22* (2013.01); *G06N 5/022* (2013.01); *H04L 67/10* (2013.01); *H04L 67/125* (2013.01); *H04L 67/306* (2013.01); *G06Q 50/01* (2013.01)

(58) Field of Classification Search
CPC ........ G06N 5/048; G06N 5/022; H04L 67/22; H04L 67/10; H04L 67/306; H04L 67/125; G06Q 50/01
See application file for complete search history.

(56) References Cited

U.S. PATENT DOCUMENTS 9,519,683 B1 * 12/2016 Samaddar ......... G06F 17/30864
9,787,489 B2    10/2017 Andrews et al.
2009/0271409 A1 10/2009 Ghosh
(Continued)

OTHER PUBLICATIONS

"Final Office Action Issued in U.S. Appl. No. 14/743,826", dated Jul. 5, 2018, 19 Pages.
(Continued)

*Primary Examiner* — Kakali Chaki
*Assistant Examiner* — Ababacar Seck
(74) *Attorney, Agent, or Firm* — Park, Vaughan, Fleming & Dowler LLP

(57) ABSTRACT

A system, method, and apparatus are provided for automatically establishing an inferred ('follow') relationship between a first member and a second member of a user community. Based on passive and/or active signals indicating affinity of the first member for the second member, the system determines whether an inferred connection from the first member to the second member would improve the first member's network within the user community. A potential improvement may be observed if the potential connection would improve some aspect or characteristic of a target or ideal network identified for the first member, and/or if there is more than a threshold level of affinity between the members. The first member's network may be pruned, if necessary, to accommodate a connection to the second member if, for example, the connection would violate a constraint associated with the target or ideal network.

20 Claims, 5 Drawing Sheets

(56) References Cited

U.S. PATENT DOCUMENTS

| | | | |
|---|---|---|---|
| 2010/0125611 A1* | 5/2010 | Boutboul | G06F 17/30699 707/794 |
| 2010/0250675 A1 | 9/2010 | Lee | |
| 2010/0257023 A1* | 10/2010 | Kendall | G06Q 30/02 705/14.46 |
| 2011/0004831 A1 | 1/2011 | Steinberg et al. | |
| 2013/0031171 A1 | 1/2013 | Serena | |
| 2013/0179438 A1* | 7/2013 | Coldicott | G06Q 10/10 707/723 |
| 2013/0238739 A1* | 9/2013 | Mallet | G06Q 50/01 709/206 |
| 2013/0254305 A1* | 9/2013 | Cheng | H04L 51/32 709/206 |
| 2013/0290110 A1 | 10/2013 | Luvogt et al. | |
| 2014/0214951 A1* | 7/2014 | Mallet | G06Q 50/01 709/204 |
| 2014/0379729 A1 | 12/2014 | Savage | |
| 2015/0026083 A1 | 1/2015 | Paliwal | |
| 2015/0169744 A1 | 6/2015 | Walkingshaw et al. | |
| 2015/0363407 A1 | 12/2015 | Huynh et al. | |
| 2016/0350665 A1 | 12/2016 | Andrews et al. | |
| 2016/0352530 A1 | 12/2016 | Andrews et al. | |
| 2016/0358214 A1 | 12/2016 | Shalunov et al. | |

OTHER PUBLICATIONS

"Non Final Office Action Issued in U.S. Appl. No. 14/743,826", dated Jan. 22, 2018, 15 Pages.

"Final Office Action Issued in U.S. Appl. No. 14/743,871", dated Jul. 14, 2017, 16 Pages.

"Non Final Office Action Issued in U.S. Appl. No. 14/743,871", dated Mar. 3, 2017, 11 Pages.

"Non Final Office Action Issued in U.S. Appl. No. 14/743,826", dated Dec. 10, 2018, 17 Pages.

"Final Office Action Issued in U.S. Appl. No. 14/743,826", dated Jun. 3, 2019, 18 Pages.

* cited by examiner

INFERRING A SOCIAL CONNECTION

RELATED APPLICATION

This application claims priority to U.S. Provisional Patent Application No. 62/169,373, which was filed Jun. 1, 2015 and is incorporated herein by reference. This application is related to U.S. patent application Ser. No. 14/743,826 and U.S. patent application Ser. No. 14/743,871, which issued Oct. 10, 2017 as U.S. Pat. No. 9,787,489, both of which were filed even date herewith on Jun. 18, 2015.

BACKGROUND

This disclosure relates to the field of computers. More particularly, a system, method, and apparatus are provided for inferring connections within a social community of users, such as a professional or social network, and/or for selecting electronic content to offer to a member having an inferred connection to another user.

Various types of professional networks and social networks exist, as well as other, less formal, communities of users. For example, some online services serve content or make it available in some other way to their user communities. In general, communities of users of professional/social networks and other online services have access to content made available by their host systems, which may be created by other users, by the systems, and/or by third parties.

Within a user community, members are often able to create explicit connections with other members. However, a given member may be interested in content created by another member with whom the given member does not have an explicit connection and/or is unable to form an explicit connection. Because there is no explicit connection, the given member may have to conduct manual searches to locate content created by the other member. However, not all users who desire to access content are adept at locating content that interests them (e.g., by configuring effective queries or searches), and not all users have sufficient time to exhaustively search for interesting content.

On the other hand, some influential and popular users are proficient at creating and/or locating valuable content but, as indicated above, it may be difficult for other users who have not formed explicit associations, friendships, or other types of connections with these proficient users to find such content. Thus, when a prolific user creates or otherwise interacts with new content, another user with whom the given user has an explicit social connection may be informed of the new content—in particular, they may be informed of the given user's activity that involved the content—but various additional users who are not explicitly connected to the prolific user may also be interested in the new content but will not learn of it from the given user's activity.

In addition, it can be difficult for a member of a professional network or social network to effectively or efficiently manage the member's personal user network. In particular, when the personal user network exceeds a few hundred connections, the member may find it difficult to keep in touch with all connected members, thereby causing the quality of some relationships to suffer, but he or she may be wary of unwittingly severing a valuable connection. Also, while the member may recognize the benefits of engaging with other members of the larger professional or social network that encompasses his or her user network, the member may not be adept at identifying other members within the larger network that could help him or her achieve those goals.

DETAILED DESCRIPTION

Figure 1:
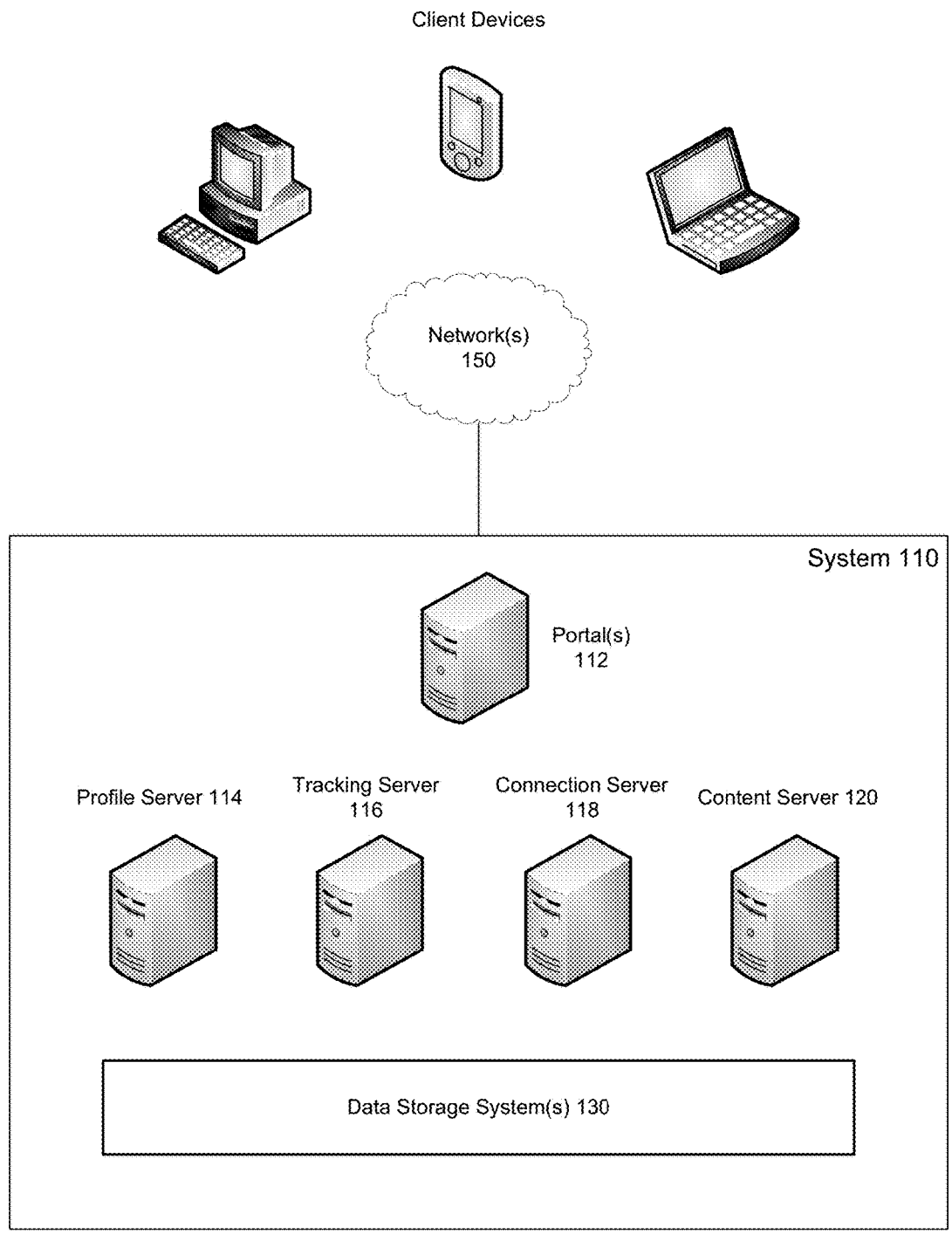
FIG. 1 is a block diagram depicting a computing environment in which a connection between a first member and a second member of a user community may be inferred, and/or a nature of that connection determined and used to select content associated with the second member to offer to the first member, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for inferring a connection or relationship between two members of a user community who are not already explicitly connected. In some circumstances the connection may be deemed a "social" connection or a "professional" connection, because they may be inferred between members of any type of user community, such as a professional network, a social network, a professional social network, or a community of users of an online application or service other than a professional network or a social network. Either, neither, or both of the users may be informed of the inferred connection.

A member's personal user network, which may alternatively be termed a personal network or a user network, encompasses the member's connections to or with other members of the user community. A personal network may encompass only explicit connections, only inferred connections, or both explicit and inferred connections.

In these embodiments, some passive signals may indicate that a first member of a community may have an affinity for a second member or be interested to some degree in electronic content associated with a second member, such as the existence of common attributes in their member profiles, overlap among their connections within the user community, demonstrated interest in similar content, etc. If sufficient active signals of interest arise, which may occur, for example, when the first member views the second member's profile, reads or otherwise interacts with content created by the second member, sends an invitation or message to the second member, etc., the system may create an inferred or implicit connection from the first member to the second member.

An illustrative inferred relationship between member A and member B may be denoted as A→B, which may be read as "A follows B," and differs from an explicit connection, which may be denoted as A ⇆ B. While a relatively large proportion (or all) of one member's activities and/or associated content may be shared with the other member via an explicit connection, in an inferred relationship between A and B (A→B) only activities and/or content associated with B are shared with A (not vice versa), and the activities/content that are shared may be restricted. In some implementations, inferred connections between two users (e.g., A→B and B→A) may have different restrictions regarding content that will be shared via the connections.

One illustrative restriction in an inferred A→B relationship is that only public activities/content of user B (i.e., not activities/content that user B only shares, or makes available, via explicit connections) may be offered to user A. In general, user B may be able configure privacy settings and/or content-sharing restrictions that apply to content associated with B (e.g., to identify connections or types of connections that may or may not receive the content) and/or B's connections (e.g., to identify certain content or types/categories of content that can or cannot be shared via the connections).

Thus, in these embodiments, the system observes and gathers signals indicating whether and when an inferred member connection (e.g., an inferred social or professional connect) should be created between a first member and a second member of the system's user community. The various signals may also indicate or suggest a strength or nature of the inferred connection.

In some other embodiments, a system, method, and apparatus are provided for also, or instead, determining the type or nature of an inferred connection between two members of a user community, and determining what content associated with one of the members, if any, to serve to the other member.

In these embodiments, users of a system that hosts the professional connection are characterized in some way, which may reflect the nature of their use of the system; their status within the system's user community; their status, role or employment within the real world; and/or other information. Based on the characterizations of a first member A and a second member B of the user community between whom a professional connection is inferred (e.g., of the form A→B), the nature of their relationship may also be characterized.

The system may then examine activity of other members of the user community that are characterized the same as or similar to either or both of the two target members, particularly activity that involves content that the host system serves or otherwise makes available to its users. From that activity, the system may determine which content or classes/categories of content that involve or that are associated with the second member will be interesting to the first member. In addition, as the first member's response to content associated with the second member is observed over time, the system may adjust its characterization of the users' inferred connection and/or the content that is made available to the first member.

In yet other embodiments, a system, method, and apparatus are provided for identifying an ideal or target personal user network of a member of a user community, or one or more characteristics of such a network. This may involve measuring or estimating the value of the member's personal network to that member and/or the network's stability (e.g., its susceptibility to degradation upon loss of a relatively small number of connections).

In these embodiments, the member's goal(s) within the user community, and/or other information (e.g., his or her member type, attributes of his or her profile), are examined or determined. Based on this information, and analysis of other members (e.g., their personal networks, their attributes), the system identifies characteristics that, if connections were formed between the member and other members having those characteristics, would help the member achieve that goal or at least bring him or her closer to the goal. The system may also, or instead, identify member characteristics that, when found among the member's connections, may obstruct achievement of the goal.

In other words, the system may identify specific member attributes that should be more (or less) prevalent among a given member's connections, meaning that the member should form more connections (or have fewer connections) with members possessing those attributes. For example, a minimum or maximum number of connections to other members having a particular attribute may be adopted as a target. Instead of (or in addition to) specific member attributes, the system may identify types of members with whom the given member should have more (or fewer) connections, and/or specific types of connections that should be increased (or decreased).

In addition, evaluating a member's personal network (e.g., to determine its value to the member, to determine whether it is approaching the member's ideal or target network) may involve measuring its stability. The personal network will predictably lose some connections over time as other members change careers, retire, or experience other significant changes, but it is preferable to avoid a level of instability that could cause the network to suffer inordinately if a single connection (or limited number of connections) is severed. If the network's apparent stability appears relatively low at some time, additional effort may be made to improve it with additional connections.

In embodiments described herein, a "connection" of a given member of a user community may refer to either or both of (a) a relationship between that member and another member, and (b) the other member. Both types of connections may have attributes or characteristics that describe them.

FIG. 1 is a block diagram depicting a computing environment in which a connection between a first member and a second member of a user community may be inferred, and/or a nature of that connection determined and used to select content associated with the second member to offer to the first member, according to some embodiments.

System 110 of FIG. 1 is (or is part of) a data center that supports a community or network of users. For example, the data center may host a social network, a professional network, or a professional social network offered by LinkedIn® Corporation. Users of system 110 may be termed members because they may be required to register with the system in order to use features, applications, and/or services of system 110. By way of illustration, the system offers members content specifically requested by the members and/or content that the system determines may be of interest to them. Members may be identified and differentiated by username, electronic mail address, telephone number, and/or some other unique identifier.

Users/members of applications and/or services hosted by system 110 connect to the system via client devices, which may be stationary (e.g., desktop computer, workstation) or mobile (e.g., smart phone, tablet computer, laptop computer). In order to interact with the system (e.g., to view content, to submit or edit content) the client devices operate suitable client applications, such as a browser program or an application designed specifically to access a service offered by system 110.

Client devices are coupled to system 110 via direct channels and/or one or more networks 150 or other shared channels, which may include the Internet, intranets, and/or other networks, and may incorporate wired and/or wireless communication links.

Via the client devices and the applications they execute, members are able to submit content to the professional community, receive content submitted by other members and/or third parties, exchange messages with other members, and otherwise interact with other members and/or content residing within the community. Various mechanisms or functions may be offered by system 110 to promote such information exchange, to allow members to "post," "share," or "like" some particular content, to comment upon or forward content, to upload or create a link to content, to connect to or to follow another member, to subscribe to content channels, to make and receive recommendations and skill endorsements, and so on.

Any interaction with an item of content by a member or by the system may be considered an "event" or a "content event" for purposes of embodiments described herein. References to members' activity within the community of users and/or with system 110 may be understood to include any of the various types of events mentioned herein, as well as others that one of ordinary skill in the art will appreciate may occur within a system such as system 110.

Interactive user/member sessions with system 110 are generally made through a portal 112, which may comprise a web server, an application server, and/or some other gateway or entry point. The portal through which a given session is established may depend on the member's device or method of connection. For example, a user of a mobile client device may connect to system 110 via a different portal (or set of portals) than a user of a desktop or workstation computer.

System 110 also includes profile server 114, tracking server 116, connection server 118, content server 120, and data storage system 130. Any server described as part of system 110 may alternatively be implemented as or termed a service, a platform, or some other type of entity.

Profile server 114 maintains profiles of members of the service(s) hosted by system 110, which may be stored in data storage system 130 and/or elsewhere (e.g., a dedicated profile repository). An individual member's profile may include or reflect any number of attributes or characteristics of the member, including personal (e.g., gender, age or age range, interests, hobbies, member ID), professional (e.g., employment status, job title, job location, employer or associated organization, industry, functional area or role, skills, endorsements, professional awards, seniority), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify or characterize the member, to characterize a member connection that involves the member, to characterize content with which the member interacts, to identify content topics/items that may interest the member, to select content to serve to the member, to record a content event).

Organizations may also be members of the service(s) offered by system 110 (i.e., in addition to individuals), and may have associated descriptions or profiles comprising attributes such as industry, size, location, goal or purpose, etc. An organization may be a company, a corporation, a partnership, a firm, a government agency or entity, a not-for-profit entity, a group or collection of associated members, or some other entity formed for virtually any purpose (e.g., professional, social, educational). Either or both organizations and individual members may "follow" and/or be followed by other members, may share and/or received shared information, may initiate and receive communications with other members, may post content and/or receive content posted by other members, may form connections with other members, etc.

In some embodiments, members are characterized by 'type,' based on their profile attributes, their activity and behavior, the content they interact with, and/or other factors. Member types may be maintained by profile server 114 (e.g., as part of their profiles) or some other component of system 110, and may change over time. An illustrative set of member types includes Recruiter (e.g., a member who recruits people), Professor (e.g., a teacher, a university professor), Student (e.g., a university student), Sales (e.g., a salesperson), Professional (e.g., a member of a profession), Public Face (e.g., an elected or other public official), and Thought Leader (e.g., an influential member of the user community, a visionary). In other embodiments additional member types may be employed, instead of or in addition to the preceding, such as Aspiring Professional (e.g., someone outside of a particular occupation who is aspiring to join the occupation) or Hiring Manager (e.g., someone who is recruiting people for a work team).

Tracking server 116 monitors and records, within data storage system 130 and/or elsewhere (e.g., one or more tracking/activity repositories), activity of system 110 and/or members of the system's user community—including content events. For example, whenever content is served by the system (e.g., to a client device operated by a member), the tracking server may be informed of what is served, to whom (e.g., which member), when it was served, and/or other information. Similarly, the tracking server may also record member actions regarding content, to include identities of the members and the content acted upon, the action that was taken, when the action was taken, how long the interaction lasted, follow-on activity (if any), etc.

Member actions regarding or involving content may be characterized or categorized, and/or the content itself may be characterized with regard to an associated member, based on that member's action regarding the content. For example, 'content creation' actions or events may include generation (e.g., drafting) of a new post (e.g., a long-form post, a poncho post), a comment, a blog entry, a presentation, a graphic, a video, or other original content (e.g., content new to system 110). 'Content curation' activity may include likes, shares, unlikes/dislikes, edits, mark-ups, and uploading of content, and/or other activity of a similar nature, such as a "best of" list that identifies, for example, the top X professionals in a particular field, the top Y employers in a particular industry, the top Z skills held by people in a particular position, etc. 'Content consumption' events may include opening, reading, downloading, or clicking on a content item. 'Profile update' activity, as the phrase implies, includes an update to a member profile, creation of a new profile, addition of a photo or other graphical or audio content to a profile, or some other action involving a member profile.

Other member activity may also be captured by tracking server 116 (and may or may not be categorized), such as visiting a page or other content collection associated with a subject or provider of a content item, subscribing to or 'following' another member or a third party (e.g., in order to receive additional content with which that other member or third party interacts), sending an invitation to another member to form a member connection, and/or other actions.

When the system must identify content to serve to a first member, and particularly when that content should include content associated with a second member to whom the given member is connected, one or more categories of content, or content items belonging to the one or more categories, may be favored over other categories, based on a type or nature of the members' connection and/or the members' types. For example, for some connections, it may be determined that content creation items (e.g., content items created by the second member) or content curation items (e.g., content items curated or acted upon by the second member) should be surfaced to the first member, instead of content consumption items (e.g., items that the second member read) or profile updates associated with the second member.

Thus, a given content item and/or action or interaction involving an item may be classified into an appropriate category (e.g., content creation, content curation) and be of a particular type (e.g., a new post, a like or a share) with regard to or in association with a particular member.

Connection server 118 records and maintains members' connections with other members, within data storage system 130 and/or elsewhere (e.g., a dedicated repository of connection data). Such connections may be stored as a graph, for example, in which different nodes represent different members and a link between two given nodes represents a connection, which may be explicit or implicit. An illustrative connection between users A and B may be stored as an ordered pair (A, B) and/or (B, A), depending on the nature of their connection (e.g., explicit, inferred) or type of connection.

In some embodiments, an explicit connection is formed when two members establish a formal connection (e.g., one of them accepts a connection request issued by the other); an implicit (or inferred) connection is formed automatically when one member takes some action or actions that involve another member and/or content associated with that other member (e.g., sends a communication, follows or subscribes to the other member, comments on a post or other content authored by the other user).

As described below, in some embodiments, an implicit connection between two members may be created based on various activity of one (or both) of the members. The creation of implicit or inferred connections between members is made by connection server 118 in some embodiments. In other embodiments, some other component of system 110, such as an inference engine or implied connection platform not depicted in FIG. 1, may create such connections.

In some implementations, member activities are reported to connection server 118 by tracking server 116, or possibly in parallel with notification to the tracking server. In these embodiments, the connection server observes action by a first member A regarding content associated with a second member B with whom the first member is not already joined by any direct connection—neither an implicit connection of the form A→B, nor an explicit connection of the form A⇆B.

Based on this observation, and as described in more below, the connection server creates an implicit connection from the first member to the second member. This connection may be described as a one-way "follow" connection in some implementations, meaning that the first member should subsequently receive content (or notification of content) associated with the second member when the second member interacts with it in some way, but the second member is not notified of content associated with the first member, unless a separate decision is made in that regard.

Some or all connections (e.g., implicit connections) may be further categorized or classified according to the types of members being connected. An exemplary, but non-limiting, set of inferred connection types from a first member to a second member includes Business Partner, Colleague, Competitor, Mentor, and Poaching.

Illustratively, a Poaching relationship may be applied when the first member is a Recruiter and the second member is a Professional. A Mentor relationship may be established when the first member is a Student and the second member is a Professional or a Public Face. A Competitor connection may be appropriate when both members are of the same type but are employed by different organizations. A Colleague connection may feature two members who work for the same organization. A Business Partner relationship may be applied when two members who are employed by different organizations work together on the same job (e.g., construction and architect professionals working on construction of a building).

In other embodiments, other types of connections may be used, in addition or instead of the preceding, such as Peer (e.g., two members of the same industry or functional area that work for different employers), Role Model, Friend, etc. A type of connection between two given members may be current or past, meaning that the members currently have that type of connection or had that type of connection in the past.

Content server 120 maintains one or more repositories of content items for serving to members, within data storage system 130 and/or elsewhere (e.g., one or more dedicated content repositories), an index of the content items, and/or other information useful in serving content to members. Illustratively, a content server may serve on the order of hundreds of millions of content items or objects every day. A content store may include various types of sponsored and/or unsponsored content items for serving to members and/or for use by various components of system 110, which may be generated within the system (e.g., by members) and/or by external entities.

Content server 120 (or some other component of system 110) may include a recommendation module for recommending specific content to serve to a member. For example, and as described in more detail below, based on the existence of a connection between two given members, the type of connection they have, and/or their member types, some (or all) content with which one of the members interacts in some way may be surfaced, offered, or presented to the other. Content with which a given member interacts in some way, such as via a content event that belongs to one of the content categories described above, may be deemed to be "associated" with that given member. A decision whether or not to surface a given content item to the other member may also depend on that other member's activity (or lack of activity) regarding items previously surfaced to him or her.

In some embodiments, after an implied connection or relationship is inferred between a first member and a second member of the user community supported or hosted by system 110, decisions regarding content associated with the second member to serve to the first member may, initially at least, depend on the nature or type of relationship (e.g., Poaching, Mentor, Colleague). Over time, however, as the system observes the first member's interaction with content surfaced to him or her, the system may adjust its determinations regarding the content associated with the second member to surface to the first member. In addition, the connection type may change over time, depending on how the first member interacts with the content, changes to the type or nature of the relationship, changes to the members' types (e.g., Student, Professional), modifications to the members' profiles (which may reflect changes in their personal lives and/or professional careers), etc.

Members of the user community hosted by system 110 have corresponding "identity" or "home" pages on the system (e.g., web pages, content pages), which they may use to facilitate their activities with the system and with each other, to view content, to form connections/relationships with other members, to view their connections and/or information regarding their connections, to review/modify their profiles, to inform friends and/or colleagues of developments in their lives/careers, to send/receive communications, etc. These pages (or information provided to members via these pages) are available to some or all other members. Members' identity pages may be stored within data storage system 130 or elsewhere.

Data storage system 130, which may be a distributed data storage system, and/or components of the data storage system (e.g., separate storage engines), include appropriate data storage devices (e.g., disks, solid-state drives), and store data used by portal 112, profile server 114, tracking server 116, connection server 118, content server 120, and/or other components of system 110 not depicted in FIG. 1.

System 110 may include yet other components not illustrated in FIG. 1, which may be inferred from the description of various embodiments. Also, functionality attributed herein to system 110 may be distributed among its components in an alternative manner, such as by merging or further dividing functions of one or more components, or may be distributed among a different collection of components. Yet further, while depicted as separate and individual hardware components (e.g., computer servers) in FIG. 1, one or more of portal 112, profile server 114, tracking server 116, connection server 118, and content server 120 may alternatively be implemented as separate software modules executing on one or more computer servers. Thus, although only a single instance of a particular component of system 110 may be illustrated in FIG. 1, it should be understood that multiple instances of some or all components may be utilized.

Figure 2:
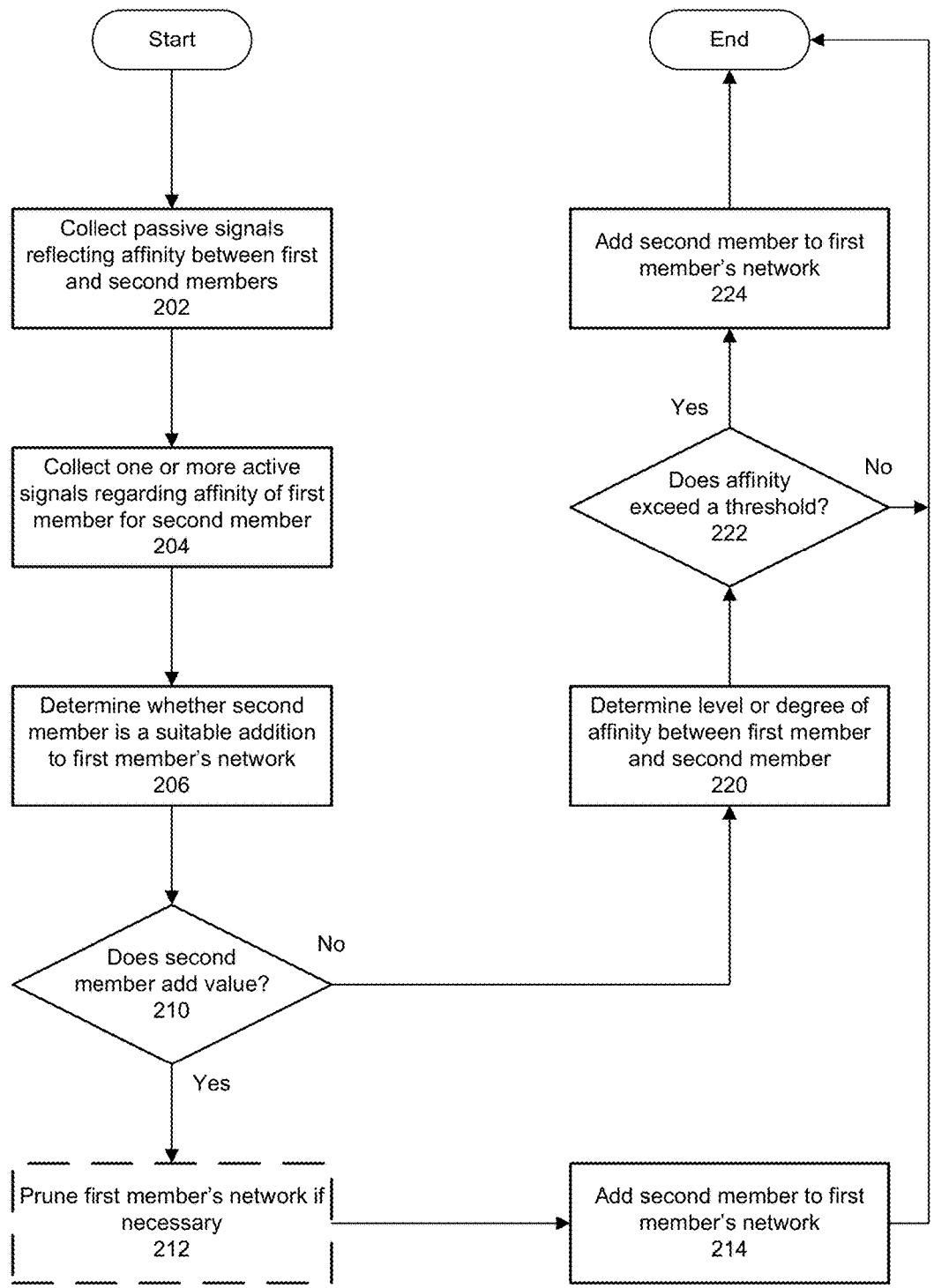
FIG. 2 is a flow chart illustrating a method of inferring a connection between two members of a user community, in accordance with some embodiments.

FIG. 2 is a flow chart illustrating a method of inferring a professional connection between two members of a user community, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

In operation 202, the system that hosts or supports the user community collects passive signals regarding affinity between a first member of the user community and a second member.

Illustrative passive signals include a number of other members that have explicit (and/or implicit) connections with both the first member and the second member, strengths of those connections (e.g., values indicating or reflecting a level of interaction between the connected members, common values for selected profile attributes, and a number of profile attributes the two members have in common (with each other and/or other members connected to both members). Some profile attributes may have particular importance or significance as passive indicators of affinity between two members, such as industry, functional area, title, job, employer, companies, school(s) attended, endorsements, content created by a member, patents, location, conferences attended, and so on.

In operation 204, the system observes and records one or more active signals of affinity by the first member for the second member.

Illustrative active signals include content events performed by the first member of types that belong to one or more content categories (described above) and that involve content items associated with the second member, such as: reading a post written by the second member (a content consumption event); sending a message to the second member, which may be an invitation to create an explicit connection (a content creation event); liking or sharing a post written by the second member (a content curation event); and so on.

In operation 206, based on some or all of the collected passive signals and/or active signals, the system determines whether the second member would be a suitable or helpful addition to the first member's network of connections within the user community. In different embodiments, this determination may involve different actions.

In some embodiments, each defined member type (e.g., Professional, Recruiter, Student) has one or more associated characteristics of an 'ideal' or 'target' network. As discussed in more detail below, an ideal or target network of an illustrative member or member type may be deduced by examining other members of that type, analyzing their career paths and trajectories, correlating network characteristics of successful members of that type, and/or other considerations.

Resulting characteristics of a member type's target network may include things such as a minimum number of connections (e.g., 400, including explicit and/or implicit relationships), diversity among connections' employers (e.g., connections are employed by at least 25 different organizations), diversity among connections' positions (e.g., at least 20 connections have positions more senior than the member's position), a maximum number of connections of a particular type (e.g., no more than 10 Mentor connections), etc.

In some alternative embodiments, ideal or target network characteristics are associated with different combinations of member attributes, instead of or in addition to being associated with member types. Thus, a member whose functional area is "network engineering" may have different target network characteristics than a member whose functional area is "marketing," even if both members are of the same type.

In operation 210, the system determines whether the second member would add value to the first member's network and, in particular, whether some attribute of the second member and/or the new connection that would be formed with the second member moves the first member's network closer to one or more ideal or target characteristics, possibly more than a threshold amount or degree of improvement. If so, the method continues with operation 212. Otherwise, the method advances to operation 220.

In optional operation 212, if addition of the second member would violate some constraint or characteristic of the first member's ideal or target network (e.g., maximum number of Mentor connections), some other member having an inferred connection with the first member may be removed from the first member's network (i.e., the inferred connection may be severed).

In some implementations, some or all inferred connections related or corresponding to the constraint compete for inclusion in the constrained characteristic, and may be compared based on measures of their affinity with the first member, the number and/or other aspect of interactions of the first member with the other members' associated content (e.g., type of interaction, duration of interaction, content categories to which an interaction belongs), and/or some other indicator(s) of the strengths of the inferred connections. For example, all competing inferred connections may be ranked by the estimated strengths of the connections, and only the top X may be retained, wherein X is part of the constraint (e.g., 10 Mentor connections). Thus, even if initial analysis of the second member indicates that creation of an inferred relationship with him or her would improve or strengthen the first member's network (e.g., in terms of one or more target characteristics), further examination may reveal that other members are better suited for the network than the second member.

In operation 214, the second member is added to the first member's network, unless the proposed new inferred connection was pruned or dropped in operation 212. After operation 214, the method may end or return to an earlier operation to consider a different pair of first and second members.

In operation 220, although addition of an inferred connection with the second member does not appear to move the first member closer to a target network characteristic, the connection may still be added if, for example, an affinity between the two members is greater than a threshold.

In some implementations, each of multiple interactions the first member could have had and/or did have with content associated with the second member (e.g., events corresponding to the active signals collected in operation 204), and possibly one or more passive signals collected in operation 202, are assigned weights indicating how well they are estimated to reflect a strong or valuable connection. In addition, each interaction is assigned a value, which may be binary to indicate whether it did (e.g., 1) or did not (e.g., 0) occur, or may be a decimal or integer value indicating, for example, a frequency with which it occurred or a ratio or frequency of that interaction's occurrence compared to occurrences of some or all interactions.

Each interaction's weight may be multiplied by its assigned value, and the results may be summed to yield a value indicating the affinity or estimated affinity between the first and second members. In other implementations, the first members' interactions and/or signals may be processed in some other way to yield an estimated affinity, using an appropriate machine-learning model, for example. This affinity may represent the value, to the first member, of the connection with the second member.

In operation 222, if the first member's affinity for or with the second member exceeds a threshold, such as the average of affinities between the first member and some number (e.g., all) of the member's inferred connections, the method continues with operation 224. Otherwise, the method may end or return to an earlier operation to consider a different pair of first and second members.

In operation 224, the second member is added to the first member's network. In some embodiments, operation 224 may also, or instead, involve pruning the first member's network—as described in association with operation 212 for example. Thus, while there may be a bias toward adding to the first member's network, a new inferred connection with the second member (of the form A→B), consideration of constraints associated with the first member's ideal or target network may overcome that bias and/or cause some other member(s) to be removed from the first member's network.

After operation 224, the method may end or return to an earlier operation to consider a different pair of first and second members.

Figure 3:
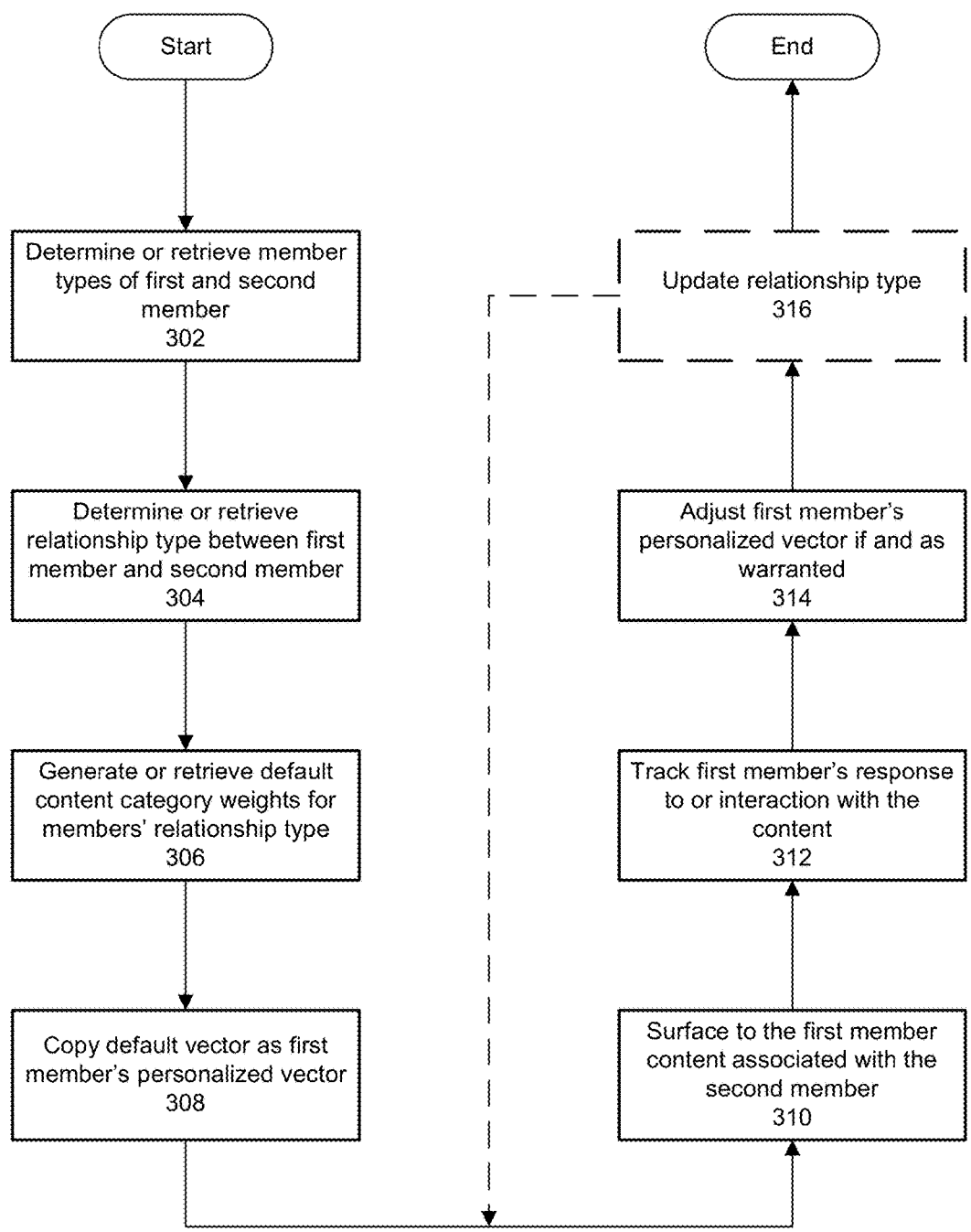
FIG. 3 is a flow chart illustrating a method of determining the nature or character of an inferred connection between two members of a user community, and/or using the nature of the connection to determine what content associated with one of the users, if any, to serve to the other user, in accordance with some embodiments.

FIG. 3 is a flow chart illustrating a method of determining the nature or character of an inferred professional connection between two members of a user community, and/or using the nature of the connection to determine what content associated with one of the members, if any, to serve to the other member, according to some embodiments. In other embodiments, one or more of the illustrated operations may be omitted, repeated, and/or performed in a different order. Accordingly, the specific arrangement of steps shown in FIG. 3 should not be construed as limiting the scope of the embodiments.

In these embodiments, a connection or relationship (e.g., a unidirectional "Follow" connection) has been inferred between a first member and a second member of the user community, which may have been established because of some action by the first member regarding content associated with the second member, as described above in association with FIG. 2, for example. The methods now described in conjunction with FIG. 3 address how to determine an initial type of the inferred relationship and/or to adjust that type, and also how to identify content (e.g., categories of content, specific content items) associated with the second member to surface to the first member. Surfacing a content item to a member may involve serving, offering, or transmitting to the member the item, a summary of the item, a notification regarding the item, and/or a link to the item.

In operation 302, the member types of the first and second member are determined, or retrieved if previously established. As discussed above, a given member may be characterized as Recruiter, Professor, Student, Thought Leader, etc. In different embodiments, different member types may be defined.

In different implementations, a given member's type may be set by the member, may be inferred from information (e.g., profile attributes) and/or activity of the member, or may be set by a third party. For example, an initial or default type may be selected for a new member based on selected profile attributes (e.g., job or role, functional area, employer (if any), industry) or may be set by the member as part of populating his or her profile. Over time, such as when the member changes jobs or employers, the member's type may be revised.

In operation 304, based on their respective types, a nature or type of relationship between the first member and second member is inferred, or may be retrieved from storage if previously established.

In some embodiments, each possible pairing of one member type with another member type may be mapped to a type of relationship/connection. Because inferred connections are unidirectional in the illustrated embodiments, if an inferred relationship exists between the second member and the first (and not just between the first and the second), the individual relationship types may differ. For example, if the first member is a Student and the second member is a Professional, the relationship between (e.g., from) the first member to the second member may be of a Mentor type, while a relationship between (e.g., from) the second member and the first member may be of a Mentee type. Alternatively, however, a relationship type may be bi-directional, such that a Mentor type relationship may be associated with any connection between a Student and a Professional, regardless of whether the connection itself is unidirectional—such as an inferred Follow connection.

In operation 306, some or all known member connections of the same type as the connection between the first and second members are examined to determine the connected members' response to content they received that was associated with the other member. In other words, for each relationship in the user community between another first member and another second member that is of the same type as the connection between the first member and the second member, the system analyzes the other first member's response to or interaction with content associated with the other second member.

For each other first member, the number of content items the other first member received that were associated with the other second member and that belong to each of the defined content categories (e.g., content creation, content curation, content consumption, profile update) is determined, as well as the number or percentage of them that the other first member interacted with in some way (e.g., by reading it, by sharing it, by commenting on it).

This analysis may be performed for each category of content, and may encompass any suitable time period (e.g., the last month, the last 3 months, the last year. Thus, the other first members' response to each category (e.g., content creation content, content curation content) is separately characterized.

The analysis of other first members' responses to content associated with the other second members yields a default vector for the first/second members' type of relationship or connection, which comprises a weight for each of the content categories, in the form [a, b, c, d], wherein each value a through d is a weight calculated for one of the four categories of content (and content events) envisioned for some embodiments (i.e., content creation, content curation, content consumption, profile update). The weights may be normalized such that a+b+c+d=1.0, with each weight indicating how much of the corresponding category of content of the second member should be surfaced to the first member, compared to the other content categories.

Thus, depending on the type of connection between the first member and the second member, it may be appropriate to send only, or primarily, one category of content to the first member that is associated with the second member. For example, if the relationship is of the Poaching type, the most interesting or useful to the first member may be profile updates. If the relationship is of the Mentor type, the vector may highlight content creation items as being most appropriate.

An illustrative process for generating content category weights is described in more detail below.

In some embodiments, default content category weights are generated offline, in which case operation 306 involves retrieving the weights instead of calculating them. Content category weights may be generated or updated on a regular, periodic, or occasional basis. For example, after the system adds a new type and/or category of content, a new set of weights may be computed for some or all relationship types.

In operation 308, the default vector of content category weights for the first and second members' relationship type is copied to use as the initial version of a personalized vector unique to the first member for the new relationship/connection. Because the relationship is new, the system cannot determine how the first member will respond to the different categories/types of content associated with the second member, and the default vector offers a starting point. Over time, the first member's personalized vector for the new relationship will be altered to reflect his actual response to the second member's associated content, and thus may eventually vary a little or a lot from the default vector.

In operation 310, content associated with the second member is surfaced (e.g., served, offered) to the first member, according to the personalized vector. Thus, if the content creation weight in the personalized vector is twice the content curation weight, the first member should receive roughly twice as many content creation events/items associated with the second member as content curation events/items.

In operation 312, the first member's interaction with the second member's content is tracked, to determine which types and categories of content items he consumes, what actions he takes with the content items he receives, and/or other information.

In operation 314, the first member's personalized vector for the second member is adjusted. This adjustment may be based on the first member's response to and/or interaction with the content surfaced to him that is associated with the second member, may be based on changes to relevant attributes of the first member and/or second member, or may be based on some other stimuli. Relevant attributes that may affect the personalized vector may include member type (e.g., Recruiter, Professional, Student), or a relevant attribute of their profile (e.g., job, role, function, employer, industry).

In optional operation 316, the type of relationship between the first member and the second member may be updated or changed, or may be severed if appropriate. For example, if the first member changes type from Student to Professional, the members' relationship may become Colleague instead of Mentor. As another example, if the first member is a Recruiter and successfully lures the second member to a new job, the relationship may be terminated, at least until the second member becomes a candidate for another position.

If the relationship type is changed, the first member's personalized vector may be overwritten with a default vector of content category weights generated for the new type of relationship. Alternatively, the personalized vector may remain unchanged for now, but may continue to be adjusted over time.

In some embodiments, variance of the first member's personalized vector from the default vector associated with the relationship type may cause a new type of relationship to be defined, especially if there is high confidence in the assigned member types of the first and second members.

After operation 316, the method may end or may return to operation 310 to provide the first member with additional content associated with the second member. It may be noted that, depending on the number of other member connections enjoyed by the first member, and/or other factors, the number of content items associated with the second member that are offered to the first member may be relatively sparse.

In some embodiments, a particular content category weight to be included in a default or personalized vector of content category weights may be computed as follows.

The vector is associated with a relationship or connection that is of a particular type (e.g., Poaching, Mentor, Colleague) and that is directed from a first member to a second member. This connection may be considered or deemed to be an implicit "Follow" connection, because it causes content associated with the second member to be surfaced to the first, but not vice versa, and may be limited to public content (e.g., content that is not limited to members having explicit connections with the second member).

Within the user community in which the vector will be used to select content associated with the second member, to provide or offer to the first member, some or all content activities involving other recipients having the same type of relationship (e.g., other "first members") are gathered over some period of time, such as the past week, the past month, the past three months, etc.

For each activity, the corresponding content item is known, as well as its category (e.g., content creation, content curation, content consumption) and type (e.g., a new post, reading an item). Other information may also be accumulated, such as how long the recipient interacted with the item, whether or not the recipient took some action regarding the item (e.g., liked it, shared it), which device and/or type of device the recipient used to take some action (e.g., mobile, desktop), whether the recipient addressed a message or other correspondence to the associated member (e.g., the other "second member"), whether the recipient looked at the associated member's profile, whether the recipient searched for related or similar content (e.g., from the same associated member), etc.

Each of these actions or potential actions can be used as a signal that indicates how valuable or interesting the corresponding content item was to the recipient. In addition, the system possesses data indicating how often the recipient connected to the user community (e.g., to system 110 of FIG. 1) within the period of time that is being analyzed.

These actions (e.g., binary values indicating whether or not the action occurred) may be aggregated in order to estimate a value V of a given content item to the recipient, as follows: $V(ci) = \Sigma_i w_i a_i$, wherein ci represents a given content item received by the recipient, a represents one of the actions above (or some other action indicative of a content item's value) and w represents a corresponding weight allotted to the action.

Illustratively, $a_i$ may be equal to 0 for each action that did not occur, or some other (e.g., integer) value for each action that did occur—such as 1 for each action that occurred, or some other value indicating the number of times the action occurred. A given action's weight w corresponds to how indicative it is of valuable or interesting content. For example, a weight associated with a 'like' action may be greater than a weight associated with a 'read' action.

After each item within a particular category of content is analyzed to determine its value V(ci) to the recipient, the value of that content category among recipients of the item is calculated or estimated. In some embodiments, the value V of a given content category cc may be calculated as:

$$V(cc) = \frac{\Sigma f(iv)}{|\text{surfaces}|}.$$

In these embodiments, the sum of estimated values for content items in the content category is divided by the number of items of that category that were surfaced to recipients (e.g., other "first members"), thus yielding an average value of the content category among recipients of items within the category.

The estimated values of each content category are then used as content category weights to assemble a vector of content category weights for the specific relationship type, as discussed above.

Figure 5:
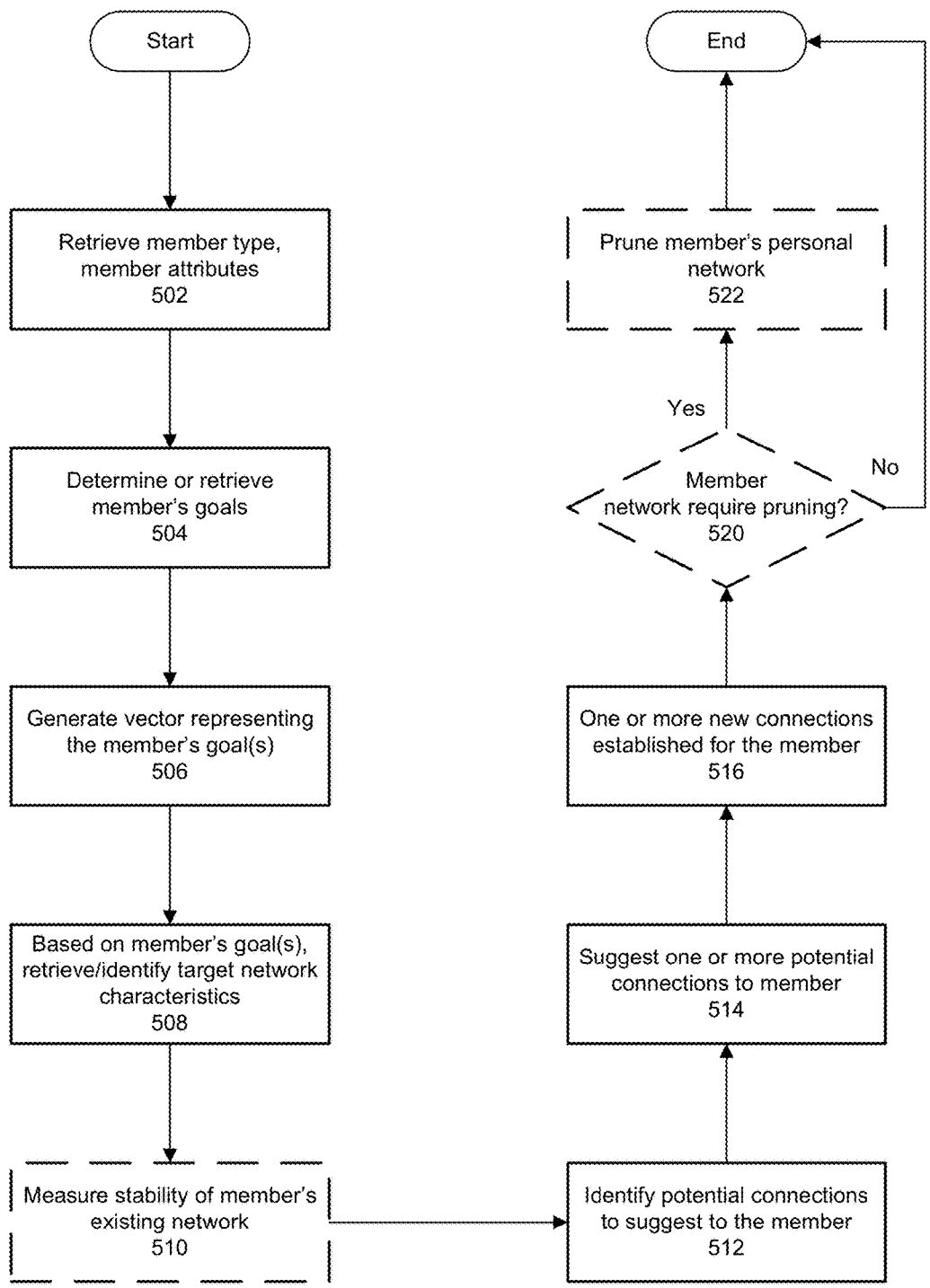
FIG. 5 is a flow chart illustrating a method of identifying one or more characteristics of an ideal or target personal user network of a member of a user community, in accordance with some embodiments.

FIG. 5 is a flow chart illustrating a method of determining one or more characteristics of a target or ideal personal user network of a member of a user community, according to some embodiments. In other embodiments, one or more of the illustrated operations may be omitted, repeated, and/or performed in a different order. Accordingly, the specific arrangement of steps shown in FIG. 5 should not be construed as limiting the scope of the embodiments. A characteristic of a target personal network of a member may alternatively be termed a target characteristic of the member's network.

In these embodiments, characteristics of members' target personal networks are identified or estimated in order to help the members improve those networks by some measure. A potential or actual improvement may be objective or subjective, and different members' personal networks may be improved in different ways, meaning that a particular network characteristic or potential connection believed to add value to one member's personal network may have a negative effect on another member's network.

For purposes of these embodiments, either or both explicit and implicit/inferred connections may be examined and/or included when determining a target network for a member. For some members, such as those wishing to disseminate content to a wide audience, the focus may be upon explicit connections (and inferred connections may be ignored); for some other members, such as those wishing to gain knowledge within their industry or functional area, inferred connections may be part of their target user networks.

Some characteristics may apply to multiple or even all members' personal networks. For example, once a member's network exceeds a relatively high number of connections (e.g., 400, 500), especially explicit connections, maintenance of that network (e.g., by maintaining communication with each connection) may become difficult, inefficient, or even impossible. Thus, a "total number of connections" (or "total number of explicit connections") characteristic may apply to a member's personal user network. In some implementations, when a member's network reaches this size, adding a new (e.g., explicit) connection may require removal or pruning of an existing connection (e.g., a connection providing less value, as described above).

In operation 502 of the embodiments corresponding to FIG. 5, a member's type (e.g., Student, Recruiter, Professional) and/or various attributes of the member are retrieved (e.g., from the member's profile within the professional network or social network).

In addition, properties of the member's personal network may be retrieved, such as total number of connections, numbers of different types of connections (e.g., explicit, implicit, Colleague, Mentor, Poaching), numbers of connections having particular attributes, attributes of members to whom the member is connected, etc.

In operation 504, one or more goals of the member are learned or retrieved. If the member's goal(s) are not already known, he or she may be queried, a goal may be inferred from the member's recent activity (e.g., searching for job opportunities, adding connections to his or her network, consuming content posted by influential members), or some other action may be taken to identify the member's goal(s).

Illustrative goals that may be encountered in some implementations include becoming a Thought Leader (or some other desired type of member), finding a new job (via a referral from another member of the user community), increasing a level of engagement within the user community, locating potential new hires, and so on. These goals may be focused on particular industries, functional areas, or other domains or sectors of the user community, meaning that different Thought Leaders may seek influence in different sectors, different job seekers or Recruiters may target different industries, etc. These target sectors may therefore be characteristics of the members' ideal networks.

In operation 506, the member's goal(s) may be represented as a vector. In particular, multiple goals within the user community may be identified or predetermined, such as those identified above and/or others, and the member's goal may be represented as a vector of the form $<g_1, g_2, \ldots, g_n>$, wherein each factor $g_i$ is a value indicating the importance or strength of a corresponding predetermined goal with regard to the member. The factors may be normalized.

In these embodiments, even if the member explicitly identifies a specific goal (e.g., to find a new job), and even if his or her goal vector is initially set based on that identification (e.g., with a factor that corresponds to 'finding a new job' set to one and other factors set to zero), the vector may be modified over time as the member's behavior within the community is observed. Thus, if he or she begins disseminating new content regarding her industry, functional area, or job, the factor corresponding to 'becoming a Thought Leader' may begin to increase at the expense of the 'finding a new job' factor.

While descriptions of embodiments provided herein may focus upon identifying characteristics of a target network of a member having a unitary goal (i.e., one goal factor set to one and other goal factors set to zero), one of ordinary skill in the art will recognize that these embodiments may be modified to benefit a member having a blended set of multiple goals (i.e., a member whose goal vector includes more than one factor that exceeds zero). Further, operation 506 may be omitted in some embodiments, in which case identification of characteristics of the member's ideal network may focus upon the member's primary goal, even if he or she has multiple goals.

In operation 508, the system obtains characteristics conducive to advancing the member toward his or her goal(s). In some embodiments, the characteristics may be determined offline, and retrieved for use as needed for assisting individual members. In other embodiments, characteristics of the member's target network may be determined dynamically.

Some characteristics may be identified or deduced based on the member's goal(s) or goal vector, and/or his or her member type. In one example implementation, if the member's (primary) goal is to be a Thought Leader, or if he or she has already been characterized as a Thought Leader, a target characteristic of the member's network will be relatively high connectivity to other members that are "bridges" to clusters of members that do not include the member and to which he or she is not already well connected.

In this implementation, some or all members of the user community are logically grouped into various clusters, pockets, sectors, domains, or other groupings, based on some common attribute(s) or features (e.g., working for the same employer, graduation from the same university, working in the same geographical area, having the same or similar skills) To make the member (more) successful as a Thought Leader, the system may seek to increase the members' connectivity (e.g., especially explicit connections) with other members that are connected to members in different clusters, at least to some minimum threshold of bridges (e.g., 100, 150, 200), but possibly not beyond a threshold number of connections the member is believed to be able to maintain.

In another example implementation, if the member's primary goal is to obtain a new job via a referral from another member of the user community, or to at least increase the chance of receiving such a referral, characteristics of the member's target network may include high connectivity with members having employers different than the member's, especially with members who are in the same functional area as the member and who have been at their current jobs for a threshold period of time (e.g., 18 months, 2 years), connectivity with other members for more than some threshold period of time (e.g., 1 year, 1.5 years), and/or members who have relatively good connectivity within their employer organizations (e.g., 10 connection, 15 connections, 20 connections). These types of characteristics may be held by people who are content in their current positions, enjoy their work, and are satisfied with their employer, and thus may be more likely to provide a job referral.

In yet another example implementation, if the member's type is Recruiter and/or the member has a goal of finding a potential new hire, characteristics of his or her ideal network may include a large number of connections (e.g., near or at the maximum that he or she can maintain), especially connections who appear unhappy in their work (e.g., they peruse job openings) or who are connected to other members who are unhappy in their work, connections who have a history of changing jobs regularly (e.g., every 1.5 years, every 2 years), connections who recently finished a significant education or training program, connections who have held a particular period for more than a threshold period of time (e.g., meaning that they have not been promoted), etc.

In another example implementation, if the member's goal is to find a Mentor, the system may strive to identify characteristics of potential mentors to recommend to the member. One manner of identifying potential mentors is to examine other members who were once similar to the member (e.g., in terms of age, education, industry, functional area, training, skills, position, gender, goal(s)) and who are now successful in their careers (e.g., as indicated by their positions or titles). In other words, professional histories of some number of (successful) other members of the user community may be examined in order to find common characteristics of their past and/or present personal networks.

In optional operation 510, the stability of the member's personal network is measured or estimated. In some embodiments, the network's stability is measured to determine whether it is overly susceptible to a significant decrease in value to the member if a relatively small number of its connections are severed (e.g., because the connected members retired, moved, changed jobs, or died). In these implementations, a value function V(m, N) represents the value to member m of the member's personal network N. In different implementations, V may be calculated differently; in some implementations, the value function is calculated by summing (or otherwise aggregating) the values of some or all of the member's $1^{st}$ degree connections within the user community (e.g., the connection values mentioned in conjunction with the method of FIG. 2, some other measure of values of individual connections).

In illustrative embodiments, the value of network N is calculated by generating a distribution of values of subnetworks of N that result from severing different portions of network N. Some quantile (e.g., the $10^{th}$ percentile, the $20^{th}$ percentile) of this distribution may then be adopted as value V.

More specifically, in these embodiments, a distribution list is initialized to an empty list, and the following steps are repeated a threshold number of times (e.g., 20, 30, 40). First, a random 10% of $1^{st}$ degree connections in network N is removed; the remainder may be designated as R(N, 10). Second, value function V is applied to R to yield V(m, R(N, 10)), which is the value of the remaining network. Third, the value of the remaining network is added to the distribution list. The three steps are then repeated to sever a different 10% of the network and calculate the value.

After the distribution of remaining network values is assembled, the target quantile (which represents the stability of network N) is compared to a threshold. If the network's stability is greater than the threshold, the network is considered stable. Otherwise, the possible instability of the member's network may cause a larger number of new connections to be suggested to the member (see below), may cause different or additional types of connections to be suggested, or some other action may be taken.

The 10% figure used above is merely illustrative, and may be different in other embodiments (e.g., 5%, 15%). Also, if a specific portion of the member's network can be identified as being particularly susceptible to atrophy or abandonment (e.g., due to the age of the connection or the connected member, based on actuarial calculations), the network's stability may be directly calculated or estimated as the value of the remaining network if that specific portion were to be removed.

In operation 512, based on the identified characteristics of the member's target or ideal network and/or other factors (e.g., the estimated stability of his or her current network), the system attempts to identify or select other members to propose to the member as new connections in order to nudge the member's personal network closer to the target. A potential connection may be selected based on that potential connection's attributes/type/goal(s), characteristics/types of the connection that would be formed, and/or because of other members with whom the potential connection is connected (e.g., their attributes/types/goals, the clusters/domains to which they belong).

In operation 514, the system suggests to the member one or more new connections, including explicit and/or inferred connections. In some implementations, an inferred connection to another member that is deemed beneficial to the member (i.e., because it moves the member's network closer to the target) may be automatically created, as described above, and the member (and/or the other member) may or may not be notified. On the other hand, the member's approval may be required in order to initiate an explicit invitation to a potential connection.

In operation 516, one or more new connections (explicit and/or inferred) are created between the member and other members of the user community.

In operation 520, the system determines whether the member's network now violates any applicable constraints, such as too many connections, too many connections of a particular nature (e.g., explicit, inferred), too many connections of a particular type (e.g., Colleague, Mentor, Competitor), too many connections to a particular type of member (e.g., Sales, Student, Professional), too many connections to members having a particular set of attributes, etc. If so, the method continues to operation 522; otherwise, the method ends.

In operation 522, the member's personal user network is pruned to remove one or more connections. If, for example, the member has more than a threshold number of explicit connections (e.g., 500), a number of explicit connections that exceed the threshold may be severed with or without notification to the member and/or the connected member. Illustratively, the least-used connections and/or those that offer the least value in terms of helping the member achieve his or her target or ideal network may be the ones that are severed.

In some embodiments, before a set of connections being considered for pruning is actually severed, the system may measure the impact of that action on the stability of the member's personal network (e.g., using the process described above in conjunction with operation 510). If the network's stability would decrease (e.g., below a threshold or by a threshold amount), the pruning operation may be abandoned.

Figure 4:
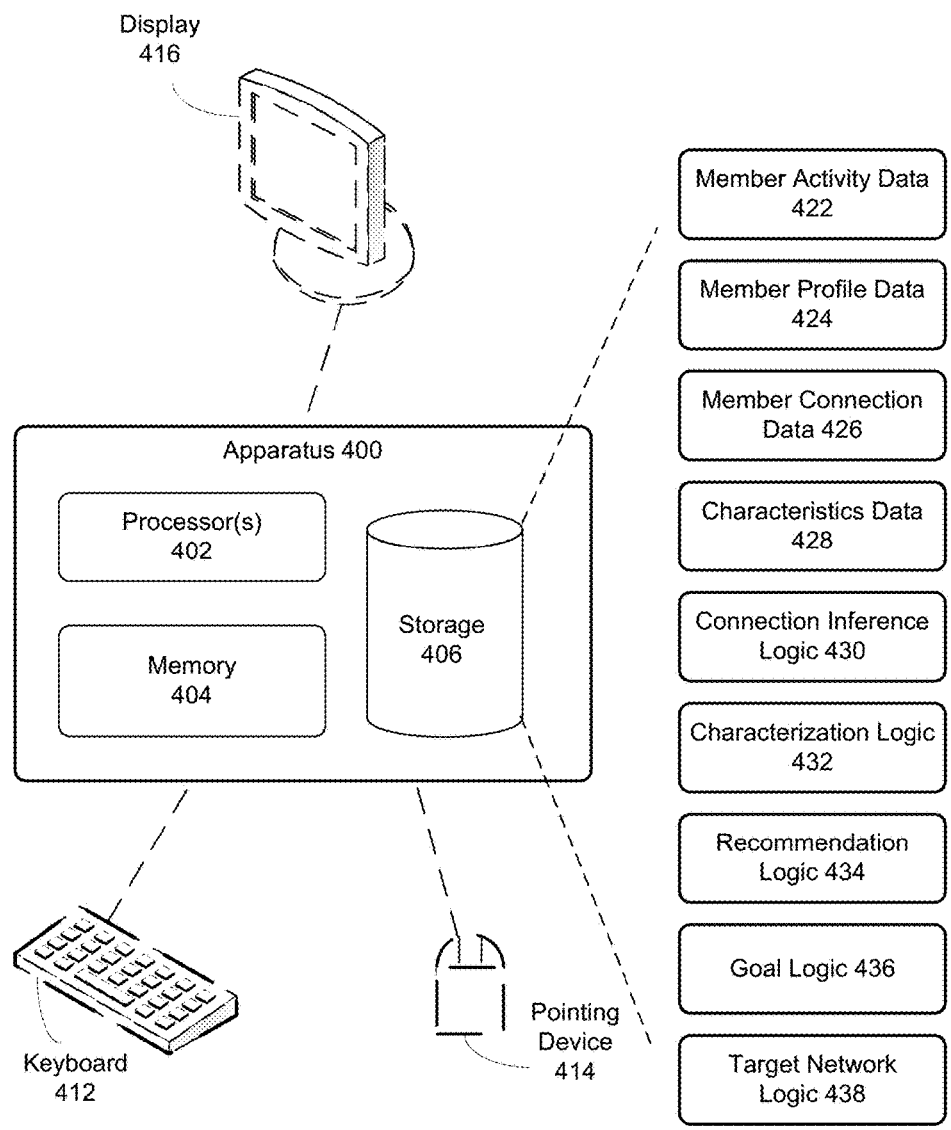
FIG. 4 depicts an apparatus for inferring connections between members of a user community, determining the nature of an inferred connection, and/or using that nature to select content to surface to one of the users, in accordance with some embodiments.

FIG. 4 is a block diagram of an apparatus for inferring connections between members of a user community, determining the nature of an inferred connection, and/or using that nature to select content to surface to one of the users, according to some embodiments.

Apparatus 400 of FIG. 4 includes processor(s) 402, memory 404, and storage 406, which may comprise one or more optical, solid-state, and/or magnetic storage components. Storage 406 may be local to or remote from the apparatus. Apparatus 400 can be coupled (permanently or temporarily) to keyboard 412, pointing device 414, and display 416.

Storage 406 stores data used by apparatus 400 to manage content event notification schemes for members of a user community, such as members of a professional (or social) network, and/or such data may be stored external to the apparatus.

Member activity data 402 identifies activity (e.g., content events) of members of the user community, which may identify each event (e.g., by timestamp), the involved member(s), the type and/or category (e.g., content category) of the event, and/or other relevant information.

Profile data 404 comprises full or partial profiles of members of the community, each of which may include any number of member attributes (e.g., member type). Connection data 406 identifies and describes members' connections within the community, including explicit and/or inferred (e.g., 'follow') connections. the connection data may include values reflecting estimated strengths of member connections and/or affinities of a given member with connected members, types of some or all connections, and/or other information regarding member connections.

Characteristics data 428 includes characteristics of networks, network connections, and members, and may be marked according to the member type(s), member goal(s), and/or other attributes of members for whom the characteristics are target characteristics of their personal networks. For example, each characteristic may include information identifying types and/or goals of members whose personal networks would benefit (or suffer) by having more connections that exhibit the characteristic. Also, or instead, each member type and/or member goal may have an associated set of characteristics that help corresponding members improve their networks (or that hurt their networks).

Storage 406 also stores logic and/or logic modules that may be loaded into memory 404 for execution by processor (s) 402, such as connection inference logic 430, characterization logic 432, recommendation logic 434, goal logic 436, and target network logic 438. In other embodiments, any or all of these logic modules may be aggregated or divided to combine or separate functionality as desired or as appropriate.

Connection inference logic 430 comprises processor-executable instructions for creating a new inferred (follow) connection from a first member of the user community to a second member, wherein the members are not already connected explicitly or with an inferred connection flowing in the same direction.

Optional characterization logic 432 comprises processor-executable instructions for characterizing member connections into one (or more) predefined types, defining new connection types, characterizing individual members into one (or more) predefined types, and/or defining new member types. Logic 432 is optional because this functionality may alternatively be provided by an entity other than apparatus 400. In operation however, characterization logic may characterize a member based on some or all of the member's attributes in his or her profile and/or the member's behavior (e.g., content events he or she initiates), and may characterize a member connection based on the connected members' types, their interaction with each other and/or with electronic content, and/or other factors.

Recommendation logic 434 comprises processor-executable instructions for recommending content associated with a given member to surface or offer to another member, particularly a member having an inferred connection to the given member. Logic 434 may consider the connection type, the members' types, attributes of the members' profiles, their interaction with each other and/or content, and/or other information when determining which content items and/or events to expose to the other member.

Goal logic 436 comprises processor-executable instructions for determining goals of members of the user community. Logic 436 may query the members and/or may analyze their behavior within the community in order to determine the importance of any number of predetermined goals (e.g., to identify a primary goal), and may assemble goal vectors as described above in order to provide a fine-grained measure of members' goals. Goal data may be stored in storage 406 and/or elsewhere. In some embodiments, goal logic 436 may be omitted and goal data may instead be obtained from an entity external to apparatus 400.

Target network logic 438 comprises processor-executable instructions for determining characteristics of target networks of specific members of the user community and identifying potential new connections that will help a member improve his or her personal network. Based on a member's goal(s), type, and/or other factors, logic 438 identifies or selects characteristics from characteristics data 428 that would improve the member's personal network, and/or characteristics that the member should avoid or limit.

In some embodiments, apparatus 400 performs some or all of the functions ascribed to one or more components of system 110 of FIG. 1.

Connection logic for updating a member's connection network within the community of users (e.g., to add or remove a connection) may be part of one of the illustrated logic modules, or may be separate. Similarly, content-serving logic for serving, presenting, or offering electronic content to members (e.g., content associated with the members' connections) may be incorporated into any of the illustrated logic modules or may be separate. If separate, the logic may execute on apparatus 400 or some other apparatus.

Stability logic for measuring or estimating the stability of a member's personal network may be included in target network logic 438, one of the other logic modules, or may be maintained as a separate logic module.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method comprising:
receiving via a graphical user interface (GUI) one or more interactions by a first member of a user community with content associated with a second member of the user community;
determining with a machine learning model that an inferred connection from the first member to the second member would improve a first connection network, of the first member, within the user community, wherein the determining comprises:
identifying a member type of the first member;
obtaining a set of characteristics of a target network associated with the identified member type, wherein the target network is deduced by examining a plurality of other members of the identified member type, and wherein the set of characteristics includes a number of connections within the target network; and determining that addition of the inferred connection to the first connection network will cause corresponding characteristics of the first connection network to more closely match the set of characteristics of the target network;

responsive to determining that addition of the inferred connection would improve the first connection network, modifying the first connection network to include the inferred connection to the second member, without modifying a second connection network of the second member, wherein said modifying comprises:
updating a stored graph of the first connection network to include the second member and the inferred connection; and causing a content feed to be displayed to the first member that includes content with which the second member interacted, the content with which the second member interacted included in the content feed based on said modifying of the first connection network to include the inferred connection to the second member.

2. The method of claim 1, wherein identifying a member type of the first member comprises:
examining multiple attributes of a profile of the first member;
wherein the member type is one of:
professional;
professor;
student;
sales;
public face; and
thought leader.

3. The method of claim 1, wherein the set of characteristics comprises one or more of:
a number of inferred connections within the target network;
a maximum number of connections, within the target network, to members having a predetermined member type; and
a minimum number of connections, within the target network, to members having diversity within a predetermined profile attribute.

4. The method of claim 1, wherein determining whether an inferred connection from the first member to the second member would improve the first connection network comprises:
for each of the interactions by the first member with content associated with the second member:
assigning a value to the content interaction; and
calculating a product of the assigned weight and a weight corresponding to the interaction; and
combining the calculated products to determine an active affinity of the first member for the second member.

5. The method of claim 4, wherein determining whether an inferred connection from the first member to the second member would improve the first connection network further comprises:
determining a passive affinity of the first member with the second member based on characteristics of one or more other members of the user community connected to both the first member and the second member;
combining the active affinity and the passive affinity to yield a value; and when the combined value exceeds a threshold, determining that the inferred connection from the first member to the second member would improve the first connection network.

6. The method of claim 1, wherein observing one or more interactions of the first member with content associated with the second member comprises:
receiving notification of a first interaction of the first member with a first content item with which the second member previously interacted; and
determining a content category associated with the first interaction.

7. The method of claim 6, wherein the content category is one of:
a content creation category;
a content curation category;
a content consumption category; and
a profile update category.

8. The method of claim 1, further comprising:
based on member types of the first member and the second member, characterizing the inferred connection as one of the following types:
colleague;
competitor;
mentor;
poaching; and
business partner.

9. The method of claim 1, further comprising:
responsive to determining that addition of the inferred connection from the first member to the second member would improve the first connection network, of the first member, within the user community:
determining that addition of the inferred connection to the first connection network will violate a characteristic of the target network; and
removing from the first connection network another inferred connection from the first member to a third member.

10. An apparatus, comprising:
one or more processors; and
memory storing instructions that, when executed by the one or more processors, cause the apparatus to:
receive via a graphical user interface (GUI) one or more interactions by a first member of a user community with content associated with a second member of the user community;
determine with a machine learning model that an inferred connection from the first member to the second member would improve a first connection network, of the first member, within the user community, wherein the determining comprises:
identifying a member type of the first member;
obtaining a set of characteristics of a target network associated with the identified member type, wherein the target network is deduced by examining a plurality of other members of the identified member type, and wherein the set of characteristics includes a number of connections within the target network; and
determining that addition of the inferred connection to the first connection network will cause corresponding characteristics of the first connection network to more closely match the set of characteristics of the target network;
responsive to determining that addition of the inferred connection would improve the first connection network, modify the first connection network to include the inferred connection to the second member, without modifying a second connection network of the second member, wherein said modifying comprises:
  updating a stored graph of the first connection network to include the second member and the inferred connection; and
  causing a content feed to be displayed to the first member that includes content with which the second member interacted, the content with which the second member interacted included in the content feed based on said modifying of the first connection network to include the inferred connection to the second member.

11. The apparatus of claim 10, wherein identifying a member type of the first member comprises:
  examining multiple attributes of a profile of the first member;
  wherein the member type is one of:
    professional;
    professor;
    student;
    sales;
    public face; and
    thought leader.

12. The apparatus of claim 10, wherein the set of characteristics comprises one or more of:
  a number of inferred connections within the target network;
  a maximum number of connections, within the target network, to members having a predetermined member type; and
  a minimum number of connections, within the target network, to members having diversity within a predetermined profile attribute.

13. The apparatus of claim 10, wherein determining whether an inferred connection from the first member to the second member would improve the first connection network comprises:
  for each of the interactions by the first member with content associated with the second member:
    assigning a value to the content interaction; and
    calculating a product of the assigned weight and a weight corresponding to the interaction; and
  combining the calculated products to determine an active affinity of the first member for the second member.

14. The apparatus of claim 13, wherein determining whether an inferred connection from the first member to the second member would improve the first connection network further comprises:
  determining a passive affinity of the first member with the second member based on characteristics of one or more other members of the user community connected to both the first member and the second member;
  combining the active affinity and the passive affinity to yield a value; and
  when the combined value exceeds a threshold, determining that the inferred connection from the first member to the second member would improve the first connection network.

15. The apparatus of claim 10, wherein observing one or more interactions of the first member with content associated with the second member comprises:
  receiving notification of a first interaction of the first member with a first content item with which the second member previously interacted; and
  determining a content category associated with the first interaction.

16. The apparatus of claim 15, wherein the content category is one of:
  a content creation category;
  a content curation category;
  a content consumption category; and
  a profile update category.

17. The apparatus of claim 10, wherein the memory further stores instructions that, when executed by the one or more processors, cause the apparatus to:
  based on member types of the first member and the second member, characterizing the inferred connection as one of the following types:
    colleague;
    competitor;
    mentor;
    poaching; and
    business partner.

18. The apparatus of claim 10, wherein the memory further stores instructions that, when executed by the one or more processors, cause the apparatus to:
  responsive to determining that addition of the inferred connection from the first member to the second member would improve the first connection network, of the first member, within the user community:
    determine that addition of the inferred connection to the first connection network will violate a characteristic of the target network; and
    remove from the first connection network another inferred connection from the first member to a third member.

19. A system, comprising:
  one or more processors; and
  an inference module comprising a non-transitory computer-readable medium storing instructions that, when executed, cause the system to:
    receive via a graphical user interface (GUI) one or more interactions by a first member of a user community with content associated with a second member of the user community; and
    determine with a machine learning model that an inferred connection from the first member to the second member would improve a first connection network, of the first member, within the user community, wherein the determining comprises:
      identifying a member type of the first member;
      obtaining a set of characteristics of a target network associated with the identified member type, wherein the target network is deduced by examining a plurality of other members of the identified member type, and wherein the set of characteristics includes a number of connections within the target network; and
      determining that addition of the inferred connection to the first connection network will cause corresponding characteristics of the first connection network to more closely match the set of characteristics of the target network;
  a connection module comprising a non-transitory computer-readable medium storing instructions that, when executed, cause the system to:
    responsive to determining that addition of the inferred connection would improve the first connection network, modify the first connection network to include the inferred connection to the second member, without modifying a second connection network of the second member, wherein said modifying comprises:

updating a stored graph of the first connection network to include the second member and the inferred connection; and a content-serving module comprising a non-transitory computer-readable medium storing instructions that, when executed, cause the system to:

causing a content feed to be displayed to the first member that includes content with which the second member interacted, the content with which the second member interacted included in the content feed based on said modifying of the first connection network to include the inferred connection to the second member.

20. The system of claim 19, wherein the non-transitory computer-readable medium of the inference module further stores instructions that, when executed, cause the system to:

responsive to determining that addition of the inferred connection from the first member to the second member would improve the first connection network, of the first member, within the user community:

determine that addition of the inferred connection to the first connection network will violate a characteristic of the target network; and remove from the first connection network another inferred connection from the first member to a third member.

* * * * *